Nov. 5, 1940.　　　A. MELDAHL　　　2,220,419
GEARING
Filed March 16, 1940
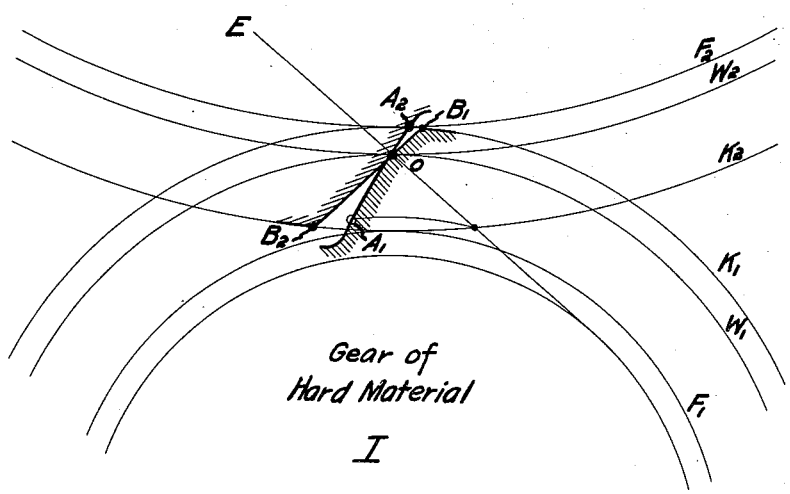
Inventor:
Axel Meldahl.
By Potter, Pierce & Scheffler,
Attorneys.

Patented Nov. 5, 1940

2,220,419

UNITED STATES PATENT OFFICE 2,220,419

GEARING

Axel Meldahl, Ennetbaden, Switzerland, assignor to Aktiengesellschaft Brown, Boveri & Cie, Baden, Switzerland, a joint-stock company Application March 16, 1940, Serial No. 324,412
In Switzerland April 1, 1939

4 Claims. (Cl. 74—462)

This invention relates to gearing and particularly to gearing in which one of the gear wheels is formed of a hard material and the other gear wheel is formed of a softer material.

The working surfaces of the teeth in general lie in part outside and in part inside the pitch or rolling circles of the gear wheels, the part of the surface between the pitch or rolling circle and the top or addendum circle being the addendum or "face," the part between the pitch or rolling circle and the root or dedendum circle being the dedendum or "flank."

An object of the invention is to provide a gearing having intermeshed gears formed with teeth of different hardness or wear-resistant qualities, the tooth profiles being such that the gearing has a longer useful life and/or greater load carrying capacity than prior gearing of the same general type. An object is to provide gearing comprising gear wheels with teeth of different hardness or wear-resistant qualities, the teeth of the gear wheel of greater hardness having "flanks" of substantially greater extent than the "faces." More specifically, an object is to provide gearing comprising a smaller gear wheel or pinion with teeth of a relatively hard material and a bigger gear wheel with teeth of a softer material, the surfaces of the teeth of the smaller gear wheel or pinion consisting in whole or in major part of tooth "flank" surfaces.

The "face" and "flank" surfaces of a gear tooth may be of substantially different size and, to reduce the stresses as computed by the Hertz formula, it has been the practice to shift the tooth profile of the smaller gear or pinion outwardly with respect to the pitch circle and to shift the tooth profile of the bigger gear inwardly. The smaller gears or pinions constructed in this manner had teeth with long face surfaces and short flank surfaces, and the bigger gears had teeth with short face surfaces and long flank surfaces. The profile displacement was carried so far in some instances that the gears engaged on only one side of the pitch circle, i. e. the teeth of the smaller gear wheel or pinion had only face surfaces and the teeth of the bigger gear wheel had only flank surfaces.

Unfortunately, however, and in spite of the reduction in the computed stresses by increasing the outward displacement of the profile of the teeth of the smaller gear wheel or pinion the wear or pitting of the bigger gear would not be eliminated.

The present invention is based upon a study of gearing which has demonstrated the fact, unknown up to the present time, that of two co-acting tooth surfaces, the parts that act as tooth flanks are subjected to a much greater extent to wear and pitting than the parts that act as tooth faces. According to this invention, in gearing of the type in which one gear wheel is of harder material than that of the meshing gear wheel, wear of the gear wheels is reduced and/or the load carrying capacity is increased by designing the gearing with extended tooth flank surfaces on the harder material gear and with relatively small tooth flank surfaces on the softer material gear.

These and other objects and advantages of the invention will be apparent from the following specification when taken with the accompanying drawing in which the single figure is a diagrammatic view illustrative of an embodiment of the invention.

In the drawing, the curve $A_1OB_1$ indicates the surface of one tooth of a gear I that is made of a hard and wear-resistant material, and the curve $A_2OB_2$ indicates the surface of the meshing tooth of a gear II that is of larger size than gear I and formed of a material of softer and less wear-resistant material. The lines $W_1$, $W_2$ are the pitch or rolling circles of the respective gears, and lines $F_1$, $F_2$ and $K_1$, $K_2$ are the root or dedendum circles and top or addendum circles, respectively, of the two gear wheels. The point O is the rolling point and line EO is the line of action of the gearing, this being represented for convenience as an involute gearing.

Contrary to prior practice, the profile of the teeth of the smaller gear wheel or pinion I has been shifted inwardly to provide a long tooth flank $A_1O$ and a short tooth face $OB_1$, and the profile of the teeth of the bigger gear II has been shifted outwardly to provide long tooth faces $B_2O$ and short tooth flanks $OB_1$.

It is to be understood that the present invention is not limited to involute gearing but applies to any shape of tooth profile and that the relative sizes of the face and flank surfaces of the meshing gears may be varied in accordance with the strength or wear-resistant qualities of the materials of the respective gears, and that the location of the pitch circles with respect to the root or dedendum circles and top or addendum circles of the respective gears may vary materially from that herein illustrated without departing from the spirit of my invention as set forth in the following claims.

I claim:

1. In a gearing, a pair of meshing gear wheels having teeth of materials of different hardness or wear-resistant characteristics, the pitch or rolling circle of the gear wheel having teeth of the greater wear-resistant characteristic being closer to the top or addendum circle of that gear than to the root or dedendum circle, whereby the surfaces of the teeth of the gear of lesser hardness or wear-resistant characteristic have a substantially greater face area than flank area.

2. In a gearing, a smaller gear wheel or pinion of hard or wear-resistant material meshing with a bigger gear wheel of softer or less wear-resistant material, the flank surfaces of the teeth of the smaller gear wheel or pinion being substantially longer than the face surfaces and the face surfaces of the teeth of the bigger gear wheel being substantially longer than the flank surfaces.

3. In a gearing, the invention as claimed in claim 2, wherein the smaller gear wheel or pinion is the driving wheel, and the bigger gear wheel the driven wheel.

4. In a gearing, the invention as claimed in claim 2, wherein the bigger gear wheel is the driving wheel, and the smaller gear wheel or pinion the driven wheel.

AXEL MELDAHL.